(12) United States Patent
Simik et al.

(10) Patent No.: US 11,112,799 B2
(45) Date of Patent: Sep. 7, 2021

(54) INTELLIGENT SOLAR POWERED POOL SKIMMING ROBOT

(71) Applicant: Milan Simik, Sarasota, FL (US)

(72) Inventors: Milan Simik, Sarasota, FL (US); Miroslav Kremecek, Kyjov (CZ)

(73) Assignee: Skimdevil Pure LLC, Lakewood Ranch, FL (US)

( * ) Notice: Subject to any disclaimer, the term of this patent is extended or adjusted under 35 U.S.C. 154(b) by 692 days.

(21) Appl. No.: 15/164,566

(22) Filed: May 25, 2016

(65) Prior Publication Data

US 2017/0022728 A1    Jan. 26, 2017

Related U.S. Application Data

(60) Provisional application No. 62/166,100, filed on May 25, 2015.

(51) Int. Cl.
*E04H 4/16* (2006.01)
*B63B 35/32* (2006.01)
(Continued)

(52) U.S. Cl.
CPC .......... *G05D 1/0206* (2013.01); *C02F 1/001* (2013.01); *C02F 1/008* (2013.01); *E04H 4/1263* (2013.01); *B63B 35/32* (2013.01); *C02F 2103/42* (2013.01); *C02F 2201/008* (2013.01); *C02F 2201/009* (2013.01); *C02F 2209/001* (2013.01); *C02F 2209/005* (2013.01); *C02F 2209/02* (2013.01);
(Continued)

(58) Field of Classification Search
CPC .......... G05D 1/0206; G05D 1/00; G05D 1/02; G05D 1/0088; C02F 1/001; C02F 1/008; C02F 1/00; C02F 2103/42; C02F 2201/008; C02F 2201/009; C02F 2209/001; C02F 2209/005; C02F 2209/02; C02F 2209/055; C02F 2209/06; C02F 2209/07; C02F 2209/10; C02F 2209/11; C02F 2303/24; E04H 4/1263; E04H 4/16; E04H 4/1654
USPC ........................................................ 210/85
See application file for complete search history.

(56) References Cited

U.S. PATENT DOCUMENTS 7,101,475 B1 * 9/2006 Maaske ................. E04H 4/1263
                                                       210/106
2006/0060513 A1 * 3/2006 Craig .................... E04H 4/1263
                                                       210/167.2
(Continued)

*Primary Examiner* — Jason M Greene
*Assistant Examiner* — Akash K Varma
(74) *Attorney, Agent, or Firm* — Sheppard Mullin Richter & Hampton LLP

(57) ABSTRACT

Systems and methods can support an autonomous pool skimming system. The pool skimming system may have a body with two or more hulls. Two or more paddlewheels may be coupled to the body. An independent motor may drive each paddlewheel. The motors may be independently controllable to support steering. The pool skimming system may have one or more processing units, two or more distance sensors, one or more solar cells, and a power supply operable to power the processing units and the motors from energy supplied by the solar cells. One or more processing modules may configure the processing units to plan and execute a traversal path across the surface of a body of water, such as a swimming pool, to collect debris into a removable basket. A portion of the traversal path may be established according to signals from distance sensors.

9 Claims, 11 Drawing Sheets

(51) Int. Cl.
    *G05D 1/00*     (2006.01)
    *C02F 1/00*     (2006.01)
    *G05D 1/02*     (2020.01)
    *E04H 4/12*     (2006.01)
    *C02F 103/42*     (2006.01)

(52) U.S. Cl.
    CPC .... *C02F 2209/055* (2013.01); *C02F 2209/06* (2013.01); *C02F 2209/07* (2013.01); *C02F 2209/10* (2013.01); *C02F 2209/11* (2013.01); *C02F 2303/24* (2013.01)

(56) References Cited

U.S. PATENT DOCUMENTS

| | | | | |
|---|---|---|---|---|
| 2006/0102532 | A1* | 5/2006 | Cadotte, Jr. | B01D 21/0027 210/94 |
| 2009/0301522 | A1* | 12/2009 | Abehasera | E04H 4/1654 134/18 |
| 2013/0104321 | A1* | 5/2013 | Michelon | E04H 4/1654 15/1.7 |
| 2014/0263087 | A1* | 9/2014 | Renaud | E04H 4/1654 210/745 |

\* cited by examiner

INTELLIGENT SOLAR POWERED POOL SKIMMING ROBOT

RELATED APPLICATION

This application claims priority to U.S. Provisional Patent Application No. 62/166,100, filed May 25, 2015 and entitled "Intelligent Solar Powered Pool Skimming Robot." The complete disclosure of the above-identified priority application is hereby fully incorporated herein by reference.

BACKGROUND

Traditional devices for automatic pool cleaning are generally intended for cleaning bottom of pools. While some are designed to clean the surface of the pool water surface, they suffer from become trapped in tight corners or at other obstacles. These devices are often unable to free themselves to navigate away from obstructions. Such devices typically have no directional control and no intelligence. They generally rely on mechanical means, such as arms, bumpers, or wheels to redirect themselves after encountering a pool wall. Without intelligent directional and navigational control, traditional devices generally travel the same route repeatedly without covering and cleaning the entire pool surface.

Accordingly, there is a need in the art for technology operable to provide autonomous pool skimming with intelligent directional and navigational control to effectively and efficiently clear water surfaces of debris.

SUMMARY

In certain example embodiments described herein, methods and systems can support an autonomous pool skimming system. The pool skimming system may have a body with two or more hulls. Two or more paddlewheels may be coupled to the body. An independent motor may drive each paddlewheel. The motors may be independently controllable to support steering. The pool skimming system may have one or more processing units, two or more distance sensors, one or more solar cells, and a power supply operable to power the processing units and the motors from energy supplied by the solar cells. One or more processing modules may configure the processing units to plan and execute a traversal path across the surface of a body of water, such as a swimming pool, to collect debris into a removable basket. A portion of the traversal path may be established according to signals from distance sensors.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The technology presented herein can support pool cleaning and maintenance technology comprising floating solar-powered devices configured for autonomous pool surface navigation and cleaning with minimal human intervention. A fully automated intelligent solar-powered pool-skimming robot may leverage pre-programmed functions and physical search to provide efficient and automated pool-skimming processes. The technology can support cleaning of residential swimming pools, larger community pools, commercial pools and man-made lakes and ponds. Programmable functions can support customization according to specific applications such as pool size, pool shape, compass orientation, and so forth. One or more sensors located at the bow or sides of the device can measure distances to pool walls or other obstacles. An associated controller can substantially optimize the skimming process. Accordingly, the cleaning device can avoid become trapped and even free itself from any difficult position or location. The device may include a catamaran-like body design having two or more hulls. Propulsion devices built into the cleaning device may be independently controlled to support precise steering and navigation. Navigation sensors may include a compass, gyroscope, accelerometer, GPS, or a solar sensor.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

Figure 1:
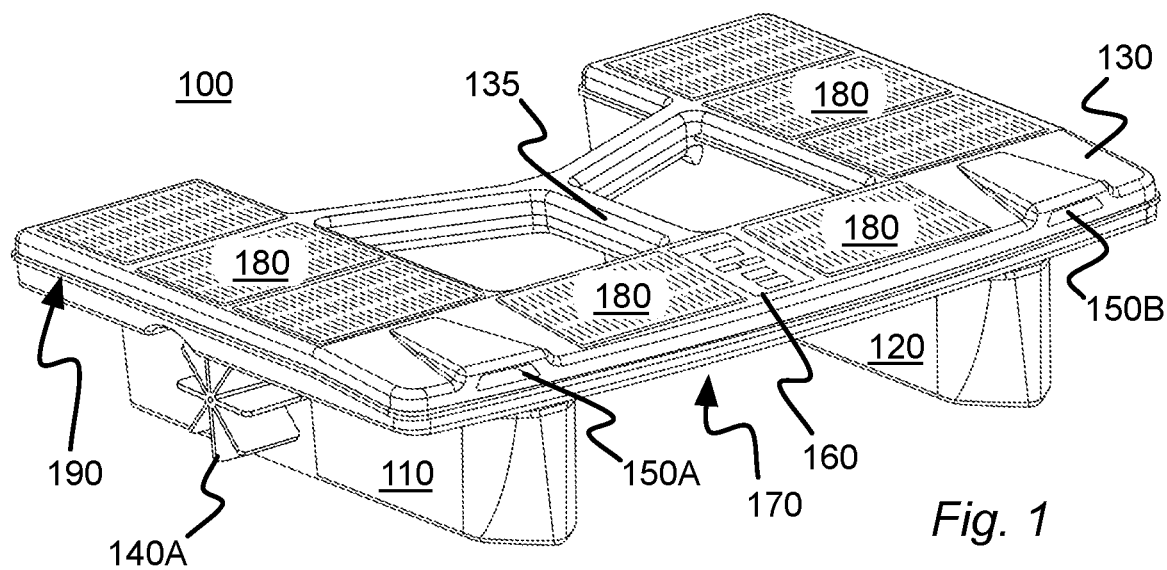
FIG. 1 is a front perspective view depicting a pool-skimming robot in accordance with one or more embodiments presented herein.

FIG. 1 is a front perspective view depicting a pool-skimming robot 100 in accordance with one or more embodiments presented herein. The pool-skimming robot 100 may include a catamaran-like body design having two or more hulls such as a right hull 110 and a left hull 120. An including one or more structural crossbeams may span the hulls. The upper deck 130 may include a plurality of solar cells 180, a user interface 160, and an integrated handle 135. A plurality of distance sensors 150 such as a right forward distance sensor 150A, a left forward distance sensor 150B, or side distance sensors (not illustrated here) can provide position awareness within the pool. Paddlewheels, such as a right paddlewheel 140A and a left paddlewheel 140B (not illustrated here) may propel the pool-skimming robot 100 through the water to aid in the collection of debris. Backwash flap mounts 170 may be located under the upper deck 130 to support mounting of a mechanism to limit or prevent backwash of collected debris from the pool-skimming robot 100. Regarding the designation of "right side" elements and "left side" element of the pool-skimming robot 100, it should be appreciated that the right side may also be referred to as the starboard side and the left side may also be referred to as the port side.

Portions of the pool-skimming robot 100 may be assembled in a watertight fashion using a gasket 190 such as a silicon seal. The gasket 190 can be installed between housing portions pool-skimming robot 100 during assembly to secure a hermetically enclosed space within. A portion of the gasket 190 may also extend beyond the edge of the pool-skimming robot 100 to serve as an impact bumper to protect the pool-skimming robot 100 against front, side or, rear impact. Hollow construction of hulls 110 and 120 can provide housing for various other components of the pool-skimming robot 100 such as the motors, batteries, sensors, and other electronics presented herein. A pressure relief valve (not illustrated here) may be installed to allow a control of the air pressure inside the housing of the pool-skimming robot 100 to protect components installed therein.

Figure 2:
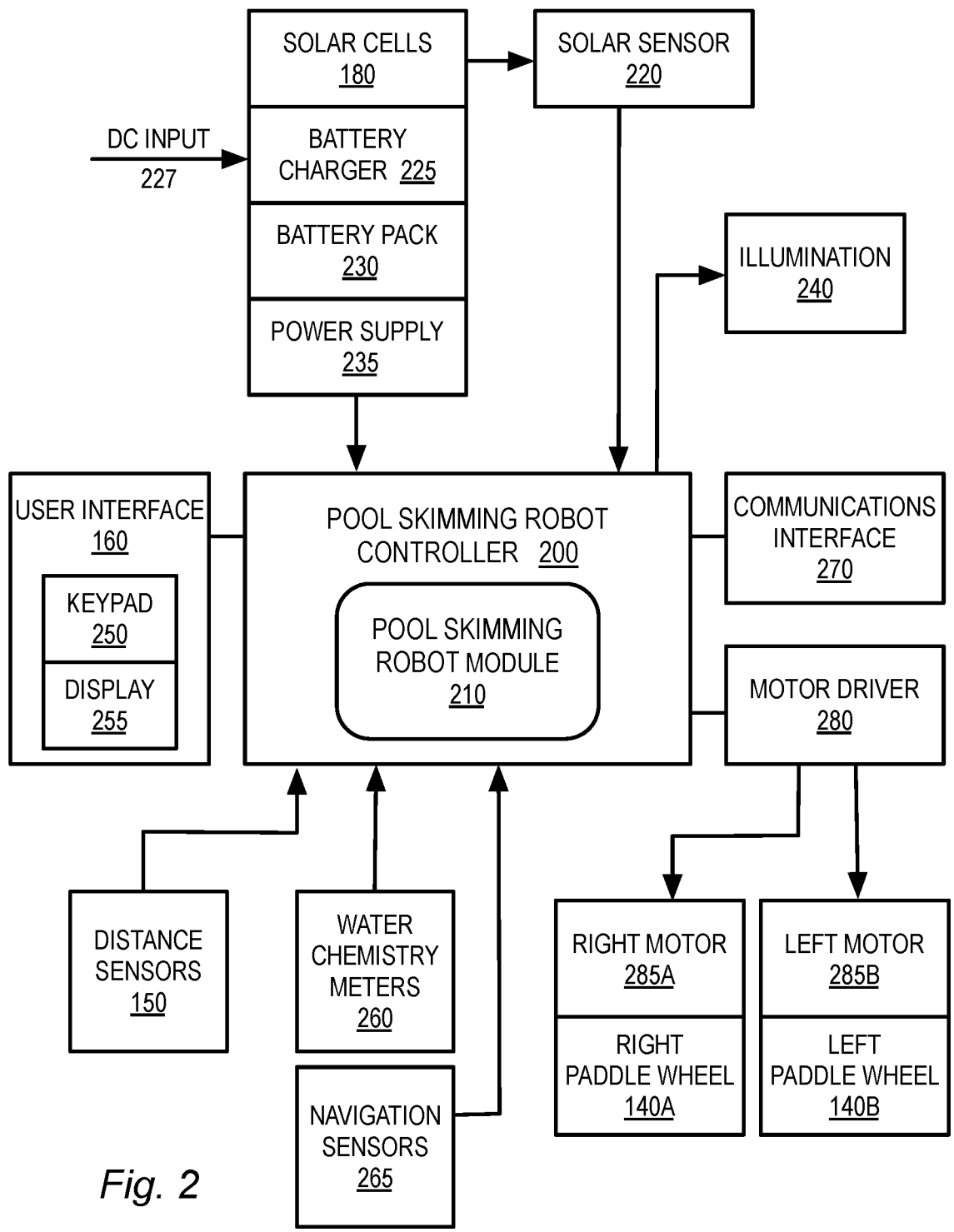
FIG. 2 is a block diagram depicting a power and control system associated with a pool skimming robot in accordance with one or more embodiments presented herein.

FIG. 2 is a block diagram depicting a power and control system associated with a pool skimming robot in accordance with one or more embodiments presented herein. A pool skimming robot controller 200 may comprise a microprocessor, microcontroller, digital logic, system-on-chip, or other such digital electronic control devices. A pool skimming robot module 210 may be associated therewith.

Energy may be supplied to the pool-skimming robot 100 by solar cells 180. The solar cells 180 may be photovoltaic. A battery charger 225 may use energy from the solar cells 180 to charge a battery pack 230. The battery pack 230 may also be charged using an external power supply according to a DC input 227. A power supply 235 may supply energy to the various electrical and electronic components associated with the pool-skimming robot 100. The power supply 235 may derive energy from the solar cells 180, the battery charger 225, the battery pack 230, and/or the DC input 227. A solar sensor 220 may provide a signal to the pool skimming robot controller 200 indicating the state of the solar cells 180. For example, the solar sensor 220 may indicate whether the ambient light levels are high or low, which may accordingly indicate if the operating environment is currently sunny or cloudy/evening.

Illumination 240 may be activated for evening operation. The Illumination 240 may be LED or other types of lighting. The Illumination 240 may be various colors, which may be randomized or controllable.

The user interface 160 of the pool-skimming robot 100 may comprise a keypad 250, and/or a display 255. The display may be an LED, LCD, OLED, or other type of graphic display coupled to the pool skimming robot controller 200.

A communications interface 270 can provide communications to and from the pool-skimming robot 100 using Wi-Fi, wireless network, Bluetooth, radio control, or other wired or wireless communication technologies or protocols.

The communications interface 270 can support control of, or communications with, the pool-skimming robot 100 from a computing device, a mobile device (such as a smartphone, tablet, or wearable), or a radio controlled (RC) remote control device. The communications interface 270 may be used to automatically or manually update the configuration, software, firmware, or hardware description associated with the pool skimming robot controller 200.

A motor driver 280 can provide the necessary voltage, current, and/or signaling to motors 285, such as a right motor 285A and a left motor 285B for propulsion and navigation. The right motor 285A can turn a right paddle wheel 140A, while the left motor 285B can turn a left paddle wheel 140B.

Distance sensors 150, such as the right forward distance sensor 150A, the left forward distance sensor 150B, or various side distance sensors, may be used for determining the position of the pool-skimming robot 100 within a pool structure. The distance sensors 150 may be used for developing a model of the pool geometry. The distance sensors 150 may be used for determining an angle of approach useful in navigation and path planning. The distance sensors 150 may comprise infrared (IR) optical sensors. The distance sensors 150 may be configured to operate below the water line. Underwater distance sensors 150 may be useful for application in infinity pools or perimeter overflow pools.

Navigation sensors 265, such as a compass, a gyroscope, an accelerometer, or GPS may be used for determining the position of the pool-skimming robot 100 within a pool structure. Using the navigation sensors 265 and the distance sensors 150, the pool-skimming robot 100 can seek to operate at optimal speed, direction, and fluency to achieve an efficient coverage of the pool surface. This may substantially support effective pool skimming while reducing the use of energy to support solar powered operations.

One or more water chemistry sensors 260 may be used to detect various water chemistry parameters of the pool water. These parameters may then be reported to a user via the communications interface 270 and/or the user interface 160. Example water chemistry parameters may include free chlorine, pH (acidity/alkalinity), calcium hardness, stabilizer, combined chlorine, salt, borate, phosphate, turbidity, total dissolved solids, and so forth. The water chemistry sensors 260 may also include a temperature sensor, or other such sensors for physical water characteristics. Information, such as chemical status, chemical requirements, temperature, and so forth may be access or displayed through either the user interface 160 or the communications interface 270. Such information may be useful for planning or obtaining service and maintenance for the associated body of water.

The battery pack 230 may include lithium-ion cells, lithium polymer cells, lithium-ion polymer cells, other battery chemistries, super capacitors, other capacitor technologies, fuel cells, any other rechargeable energy storage technology, or any combination thereof.

The paddlewheels 140 may be installed directly on the shaft of the motors 285. The motors 285 may be direct current (DC) planetary gear brush motors with gears built directly in one housing with motor. The motors 285 may also be stepper motors or any other type of electromechanical motor technology.

The pool skimming robot controller 200 may independently control each of the paddlewheels 140. The pool-skimming robot 100 may support fully robotic functionality, efficient skimming, and have the ability to free itself from any corners and obstacles. A safety feature may be associated with the motors 285 to detect, prevent, and/or mitigate a sudden increased resistance indicated at one or more of the paddlewheels 140. An object or a body part contacting the paddlewheel 140 while it is running may cause such a resistance increase. The pool skimming robot controller 200 can recognize such a condition as a sudden current load increase above a specified threshold. The motors 285 may be stopped, reversed, or the situation may be otherwise mitigated.

The solar sensor 220 can indicate when the voltage of the battery pack 230 may fall due to low solar charging conditions. The pool-skimming robot 100 may use a signal from the solar sensor 220 to navigate towards available sunshine in order to maximize energy production from the solar cells 180.

Various functions of the pool-skimming robot 100 may be selected using the user interface 160 and/or the communications interface 270. Among various others, these functions may include On/Off, Start/Stop, and Timer. Using the timer functionality, the user can select specific days in a week and time intervals for operation of the pool-skimming robot 100. The pool-skimming robot 100 may be automatically activated and deactivated as specified by the one or more timers.

Another selectable function of the pool-skimming robot 100 may include a solar optimization. Prior to ending an operation cycle, the pool-skimming robot 100 may seek to navigate towards sunshine to recharge the battery pack 230. After completion of an operating cycle, the pool-skimming robot 100 can navigate close to a starting position where it was activated. Corrections may be made automatically to return to this starting position to mitigate drift due to wind, water current, waves or other outside environmental conditions. Returning to a starting point, can supports operations at larger community or commercial pools (or ponds and lakes) to locate the pool-skimming robot 100 when not in operation.

Another selectable function of the pool-skimming robot 100 may include speed control. Lower or higher speeds may be selected. The speed may be automatically adapted by the pool skimming robot controller 200 to size of the water surface and interval of operation.

Another selectable function of the pool-skimming robot 100 may include edge response. A user can select a distance for responding to a wall as well as a specific mode or combination of modes such as reverse, turn around, reflect, follow the wall, and so forth.

Another selectable function of the pool-skimming robot 100 may include random motion component. A random change in a movement or pattern or motion may be introduced periodically.

Another selectable function of the pool-skimming robot 100 may include sound notification. The user can activate or deactivate acoustic indication of different functions or operations.

The pool-skimming robot 100 may be switched from an autonomous mode to a manual mode. A human operator can control (and steered) the pool-skimming robot 100 via a mobile device or RC controller while the pool-skimming robot 100 is in the manual mode. Manual control may be beneficial in specific areas where large amount of debris may have accumulated or in areas that seem less accessible during automatic skimmer operation. Use of the pool-skimming robot 100 like remote controlled RC boat can provide entertainment and fun while also cleaning a pool.

According to one or more embodiments, the pool-skimming robot 100 may be without solar cells 180. The battery pack 230 may be charged using the DC input 227. A docking station may be provided where the pool-skimming robot 100 may automatically return for recharging when the battery energy level falls below set threshold.

Figure 11:
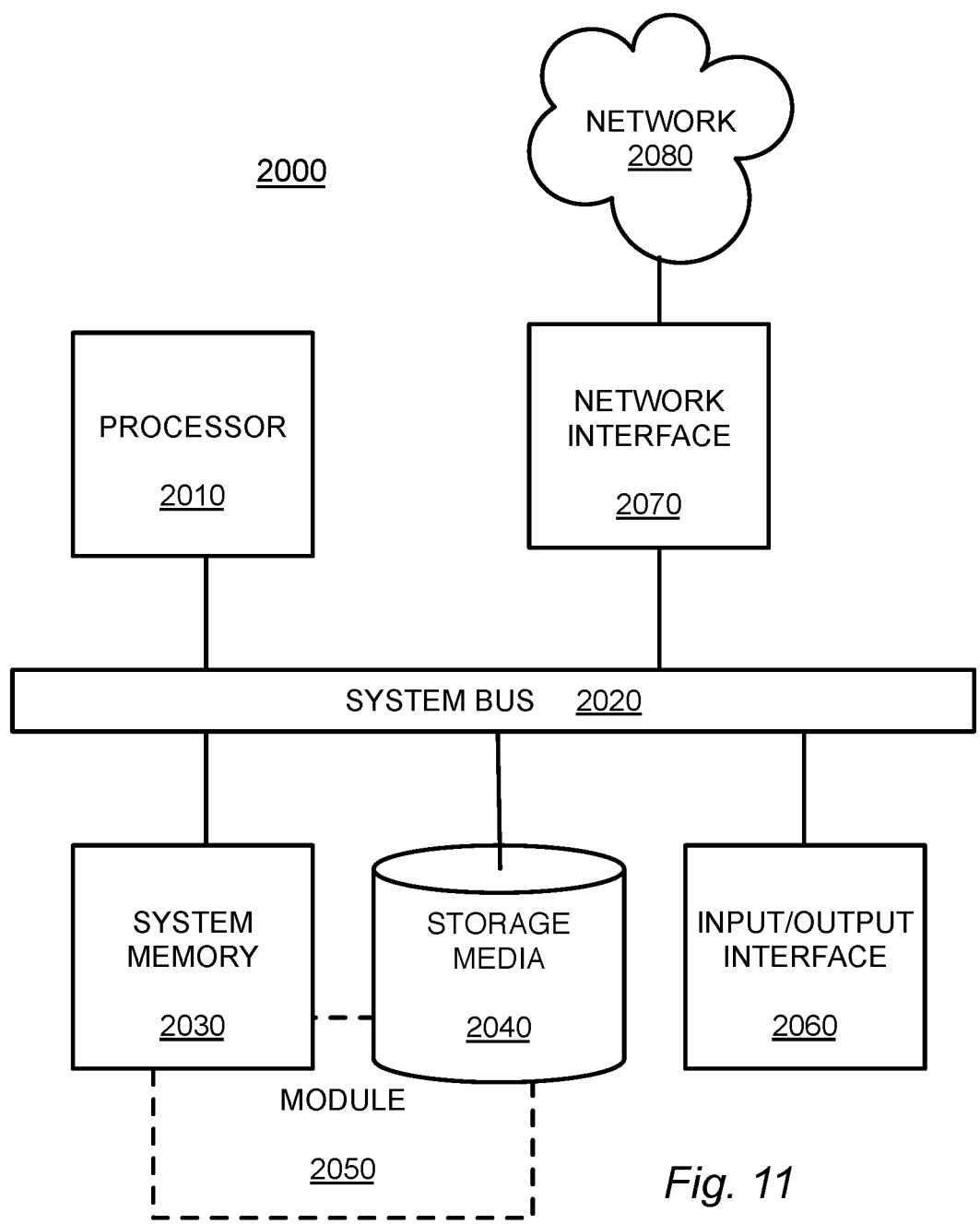
FIG. 11 is a block diagram depicting a computing machine and a module in accordance with one or more embodiments presented herein.

The pool skimming robot controller 200 or any other systems associated with the technology presented herein may be any type of computing machine such as, but not limited to, those discussed in more detail with respect to FIG. 11. Furthermore, any modules associated with any of these computing machines, such as the pool skimming robot module 210, or any other modules (scripts, web content, software, firmware, or hardware) associated with the technology presented herein may by any of the modules discussed in more detail with respect to FIG. 11. The devices and computing machines discussed herein may communicate with one another as well as other computer machines or communication systems over one or more networks such as any network associated with the communications interface 270. Such networks may include any type of data or communications links or network technology including any of the network technology discussed with respect to FIG. 11.

Figure 3:
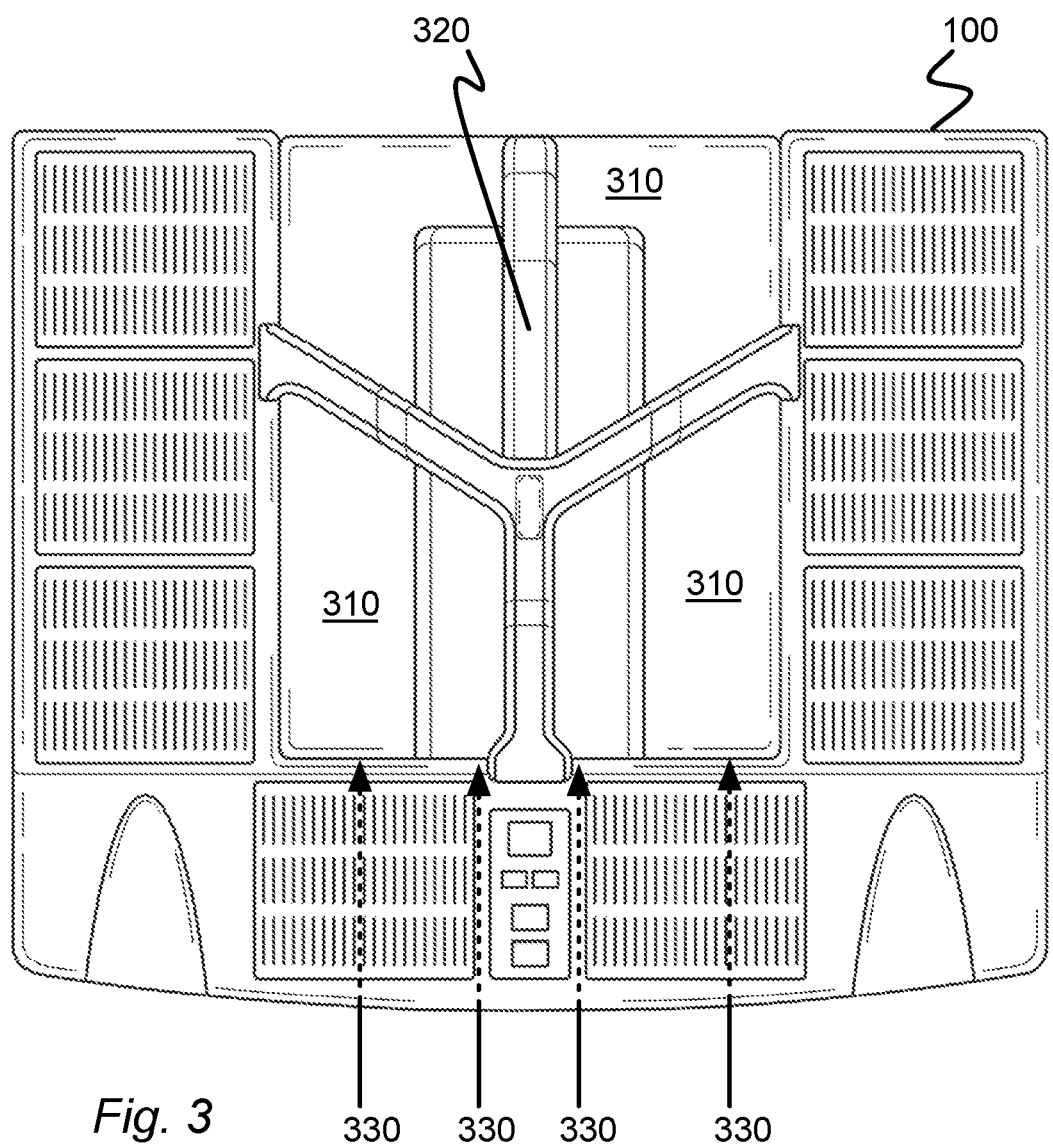
FIG. 3 is a top plan view depicting a pool-skimming robot with a debris collection basket in accordance with one or more embodiments presented herein.

FIG. 3 is a top plan view depicting a pool-skimming robot 100 with a debris collection basket in accordance with one or more embodiments presented herein. The pool-skimming robot 100 can support an internal basket assembly 310 for debris collection. An open basket front 330 can allow debris to enter, and become trapped within, the basket assembly 310 as the pool-skimming robot 100 navigates the water surface. The basket assembly 310 may be easily removed from the pool-skimming robot 100 using the basket handle 320. Once removed, any debris collected within the basket assembly 310 may be discarded and the basket assembly 310 may be replaced into the pool-skimming robot 100.

As the pool-skimming robot 100 navigates the water surface, an open area under the upper deck 130 and between the right hull 110 and a left hull 120 can form an inlet for water. The water is skimmed through the open basket front 330 and is forced through the basket assembly 310 as the pool-skimming robot 100 moves forward across the water surface.

The basket assembly 310 may comprise a rigid basket framework with a replaceable filter insert. Alternatively, the basket assembly 310 may comprise a rigid permanent surface configured to pass water while filtering debris from the water. For example, the filtering surface may comprise pores, holes, slots, vanes, or may be otherwise porous or water permeable. Alternatively, the basket assembly 310 may comprise a rigid framework with a permanent filtering surface affixed thereto. Various coarseness levels of filters can be employed depending on specific skimming requirements. For example, pools with a screened cage and/or little few trees in the yard may require a finer filter than pools without a cage and/or near more trees.

Figure 4:
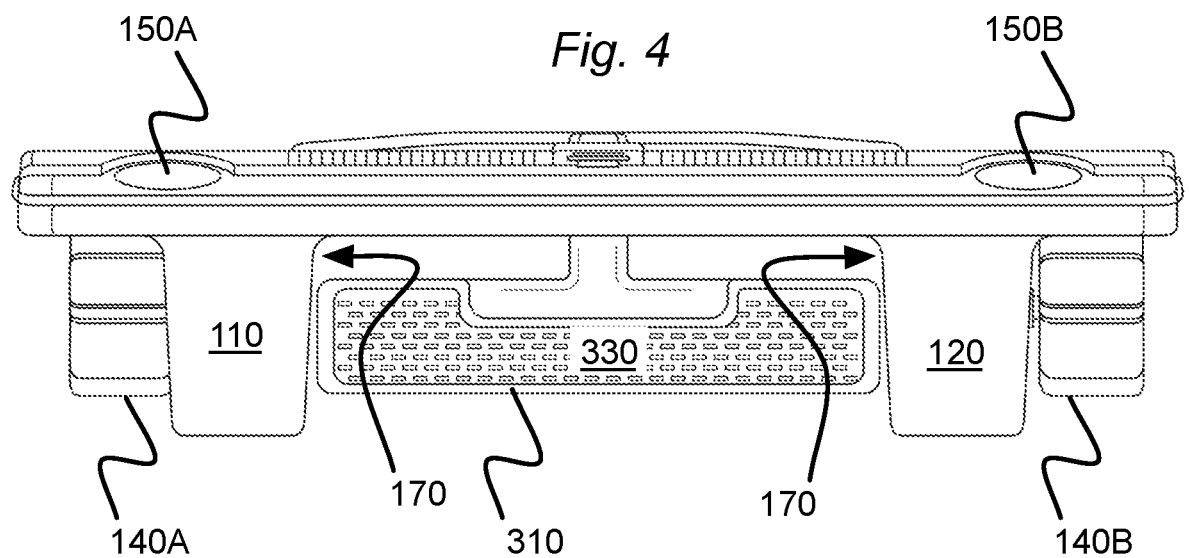
FIG. 4 is a front elevation view depicting a pool-skimming robot supporting a backwash prevention system in accordance with one or more embodiments presented herein.

FIG. 4 is a front elevation view depicting a pool-skimming robot supporting a backwash prevention system in accordance with one embodiment. A backwash flap assembly may be positioned with respect to one or more backwash flap mounts 170 to prevent collect debris from exiting the basket assembly 310. In the illustrated example, two backwash flap mounts 170 are located under the upper deck 130 and between the right hull 110 and a left hull 120.

The upper deck 130 of the pool-skimming robot 100 can extend to the sides beyond both the right hull 110 and the left hull 120 providing a protective overhang. The extended overhang of the upper deck 130 may comprise one or more bumpers or a continuous bumper around the perimeter of the upper deck 130. The narrow lower part of the hulls may comprise typical boat hull or catamaran geometry. Such geometry may taper towards the front edge in a hydrodynamic fashion. This geometry can support forward movement with directional stability with reduced drag. These efficiencies can support improved operation of the pool-skimming robot 100 under solar power. The upper deck 130 can provide enough area for placement of photovoltaic solar cells 180. The upper deck 130 can also provide protection for the paddlewheels 140 located underneath the upper deck 130 overhang. The bottom of the hulls may protect the paddlewheels 140 from below. The paddlewheels 140 may be designed with eight vanes. The paddlewheels 140 may be sized and located such that they are protected from direct impact either during pool skimming processes or while located outside of pool for transportation, servicing, storage, or disposal of collected debris. The positioning of independently controlled paddlewheels 140, such as the right paddlewheel 140A and the left paddlewheel 140B, on both sides of the pool-skimming robot 100 can provide for a precisely steerable design. Being able to turn each paddlewheels 140 in either direction (for example, forward or reverse) can further improve the precision with which the motion and navigation of the pool-skimming robot 100 may be controlled.

According to certain embodiments of the pool-skimming robot 100 intended for larger commercial applications or ponds/lakes, additional features may be desired. Of course, such features may be applied to any other embodiments as well. For example, positioning technology (such as GPS) can return the pool-skimming robot 100 to a specified location. For example, to a location launch, retrieval, charging, storage, and so forth. Also, a larger capacity basket assembly 310 may be useful for greater quantifies of debris or for larger types of debris.

Figure 5:
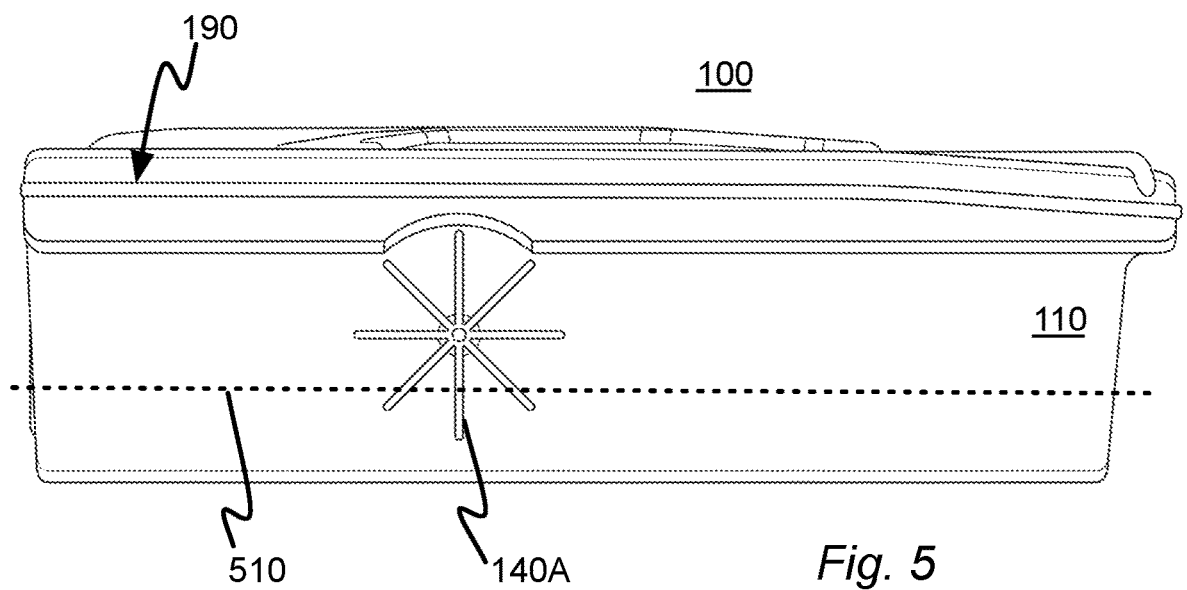
FIG. 5 is a side elevation view depicting a pool-skimming robot in accordance with one or more embodiments presented herein.

FIG. 5 is a side elevation view depicting a pool-skimming robot 100 in accordance with one embodiment. The pool-skimming robot 100 can float on the water surface on two or more hulls to reduce resistance. The buoyancy of the pool-skimming robot 100 may be designed or tuned to set the water level 510 to a desired position. In the illustrated example, the water level 510 is established to interface at approximately the midpoint of the lower half of the paddlewheels 140.

Figure 6:
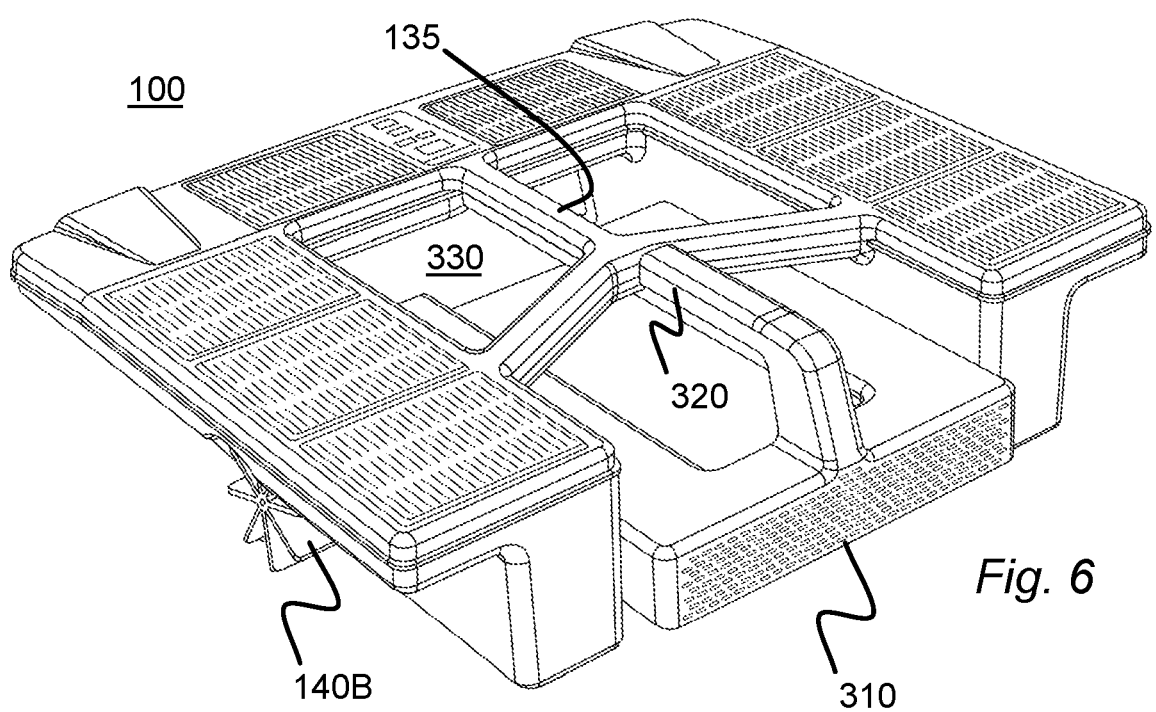
FIG. 6 is a rear perspective top view depicting a pool-skimming robot in accordance with one or more embodiments presented herein.

FIG. 6 is a rear perspective top view depicting a pool-skimming robot in accordance with one embodiment. According to the illustrated embodiment, the basket assembly 310 may be withdrawn from the rear of the pool-skimming robot 100 using the basket handle 320. When inserted for operation, the basket assembly 310 may be retained within the pool-skimming robot 100 using friction, gravity, detents, rails, clips, or other similar techniques.

Figure 7:
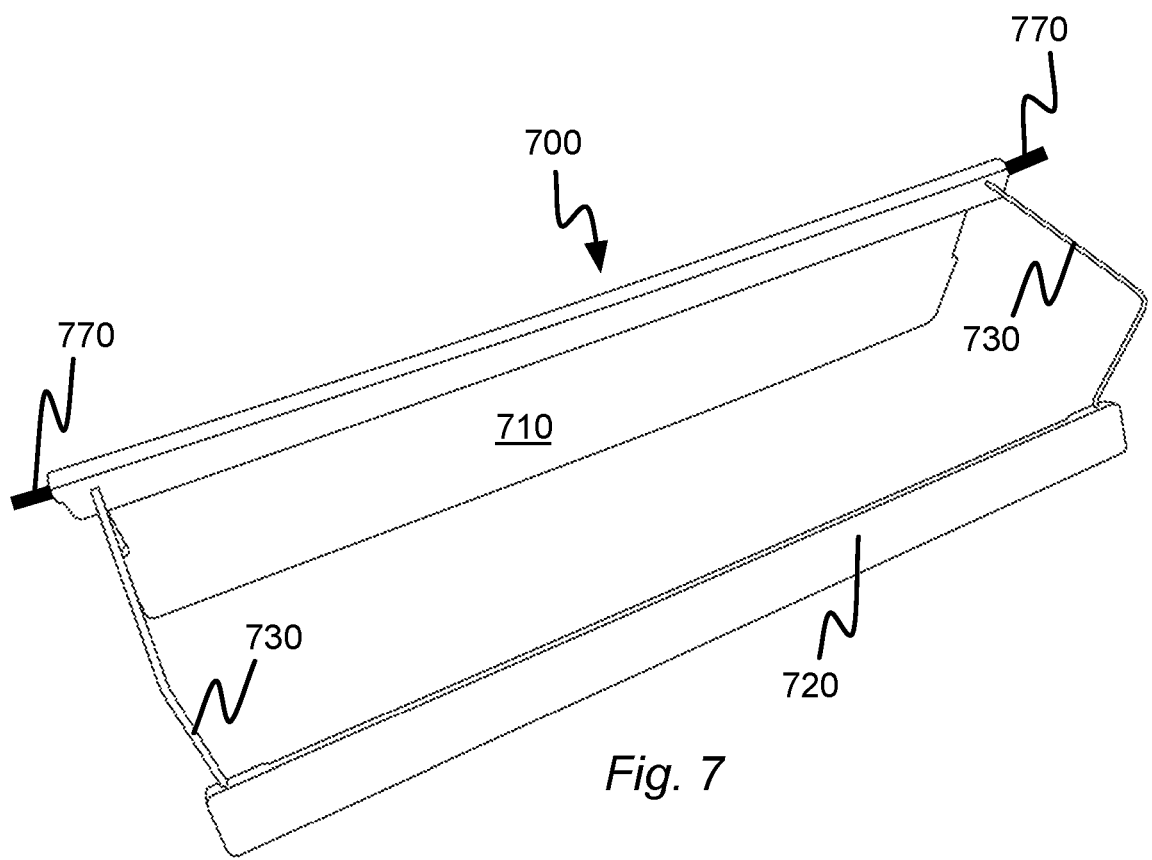
FIG. 7 is a perspective view depicting a backwash prevention assembly for a pool-skimming robot in accordance with one or more embodiments presented herein.

FIG. 7 is a perspective view depicting a backwash prevention assembly for a pool-skimming robot in accordance with one embodiment. A backwash flap assembly 700 may comprise a backwash flap 710 coupled to a backwash balance 720 using a backwash frame 730. The backwash flap 710 may be operable to rotate into open and closed positions on backwash flap pivot pins 770. One or more backwash flap mounts 170 may be configured on or within the pool-skimming robot 100 to receive the backwash flap pivot pins 770 and support the backwash flap assembly 700. The backwash flap assembly 700 may operate directly in front of the open basket front 330 of the basket assembly 310. In the illustrated example, two backwash flap mounts 170 are located under the upper deck 130 and between the right hull 110 and a left hull 120 of the pool-skimming robot 100.

The backwash flap assembly 700 can substantially reduce the backflow of collected debris out of the pool-skimming robot 100 and into the pool. Without the backwash flap assembly 700, debris backflow may occur if the pool-skimming robot 100 turns rapidly, turns sharply (for example, more than twenty degrees away from the normal line), reverses direction, or is off/idle.

The backwash balance 720 can serve was a float, balance, or control surface to mechanically push the backwash flap 710 into an open position as the pool-skimming robot 100 moves in a predominantly forward direction. Other types of motion (those that are not substantially in a forward direction) can cause the backwash balance 720 to push the backwash flap 710 into a closed position thus preventing backflow of debris.

According to certain embodiments, the backwash flap 710 may be controlled using a motor, such as a servomotor. The pool skimming robot controller 200 may automatically close such an electronically controlled backwash flap 710 to prevent backflow of collected debris to the pool. The electronically controlled backwash flap 710 may be configured with a return spring such that the motor only needs to activate to open the backwash flap 710. The application of the motor and of the spring may be revered as well.

Figure 8:
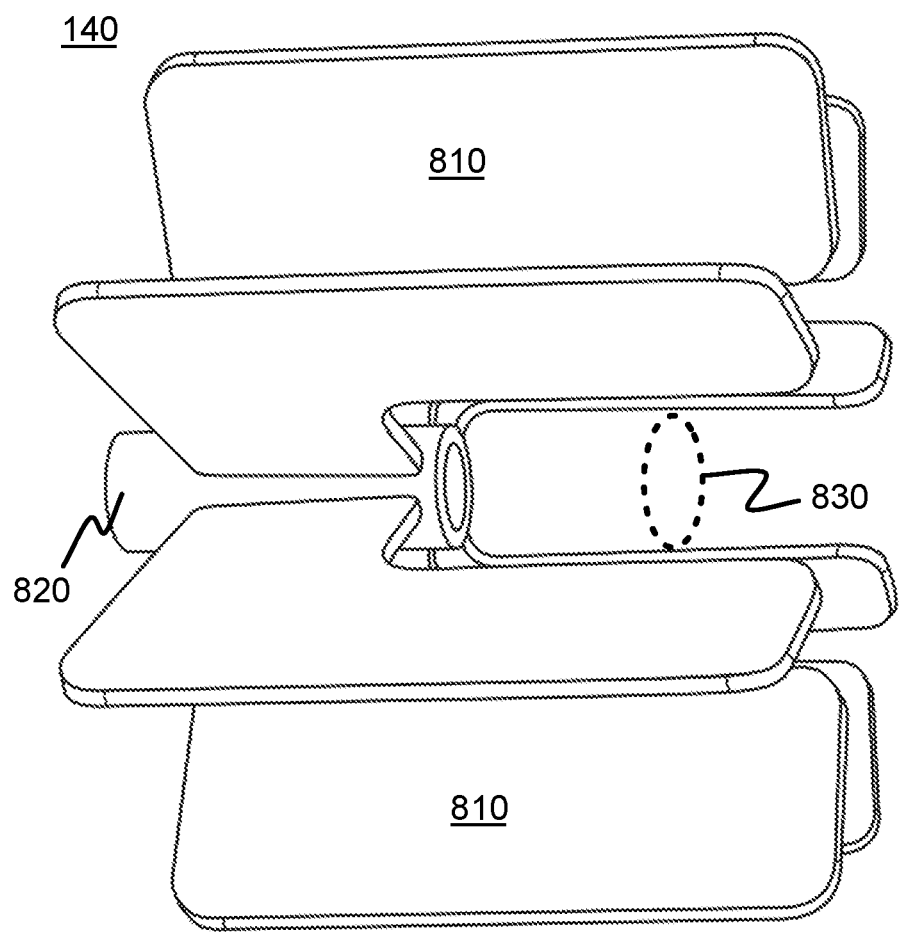
FIG. 8 illustrates a side hub paddle wheel for a pool-skimming robot in accordance with one or more embodiments presented herein.

FIG. 8 illustrates a side hub paddle wheel 140 for a pool-skimming robot 100 in accordance with one embodiment. The paddle wheel 140 can comprise a plurality of paddles 810 or vanes affixed to a hub 820. A portion of the paddles 810 joined to the hub 820 may be located to one side of the paddles 810 in an offset fashion. Such an offset arrangement can provide a central void 830 between a substantial portion of the length of the paddles 810. The substantial portion may be at least 50%, 75%, 90%, or various other ratios according to various embodiments. The geometry of the offset paddles 810 and the central void 830 can support a paddle wheel 140 design having improved efficiency and reduced noise.

Figure 9:
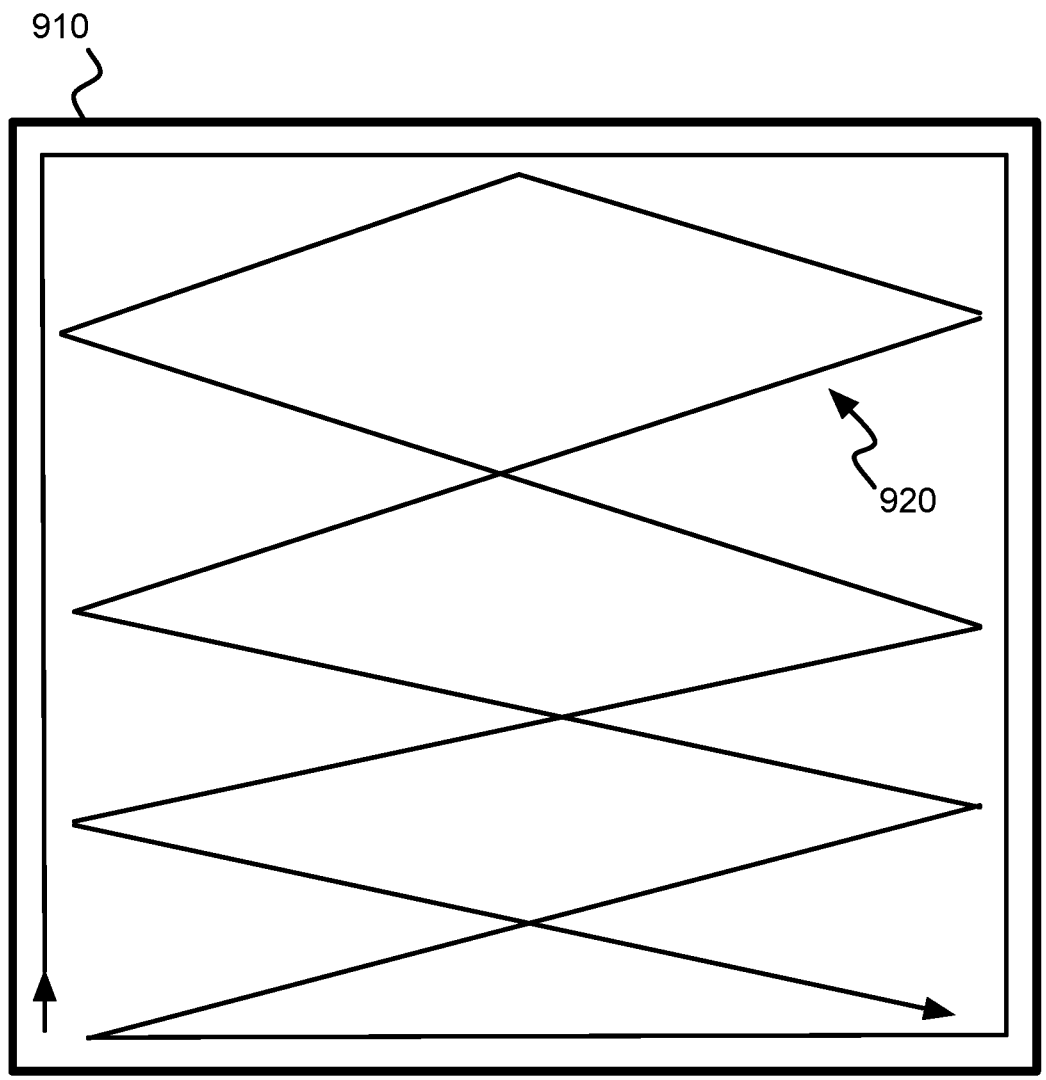
FIG. 9 illustrates a pool traversal plan for a pool-skimming robot in accordance with one or more embodiments presented herein.

FIG. 9 illustrates a pool traversal plan for a pool-skimming robot 100 in accordance with one embodiment. The pool-skimming robot 100 can navigate a body of water, such as a swimming pool, according to a path 920. The pool-skimming robot 100 can navigate a circumference near the water's edge such as at the pool perimeter 910. The distance sensors 150, particularly sensors at the sides of the pool-skimming robot 100, or any other side sensors, may be used to establish the circumference. While navigating the circumference using sensors, the pool skimming robot controller 200 can develop a model for the geometry of the body of water. The pool-skimming robot 100 can also navigate a series of transversals across the geometry. Transversal angles may be determined and controlled using two or more distance sensors 150.

The distance sensors 150 can indicate distance from pool walls or other obstacle and provide this information to the pool skimming robot controller 200 for processing. The detection distance can be customized according to the specifics of each particular application. For example, pool-skimming robot 100 may move at lower speed in a smaller pool. Also, the detection distance may be shorter in smaller and slower applications. Triangulation and other geometrical processing from multiple distance sensors 150 can support determining an angle of approach between the path of the pool-skimming robot 100 and a perimeter wall of the pool.

The navigation sensors 265 can collect information about particular coordinates, angles, or positional rates for the pool-skimming robot 100 or the pool it is operating within. The pool skimming robot controller 200 can process information from the distance sensors 150 and the navigation sensors 265 to establish a mapping of the pool geometry. The pool-skimming robot 100 may automatically select optimal routing and speed for the skimming process. Such automated selection can seek to clean the water more effectively, in a shorter period of time, and with reduced power consumption. According to certain embodiments, brushes may be installed on the pool-skimming robot 100 to support cleaning of pool walls near the water line 510 where debris commonly collects.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 10:
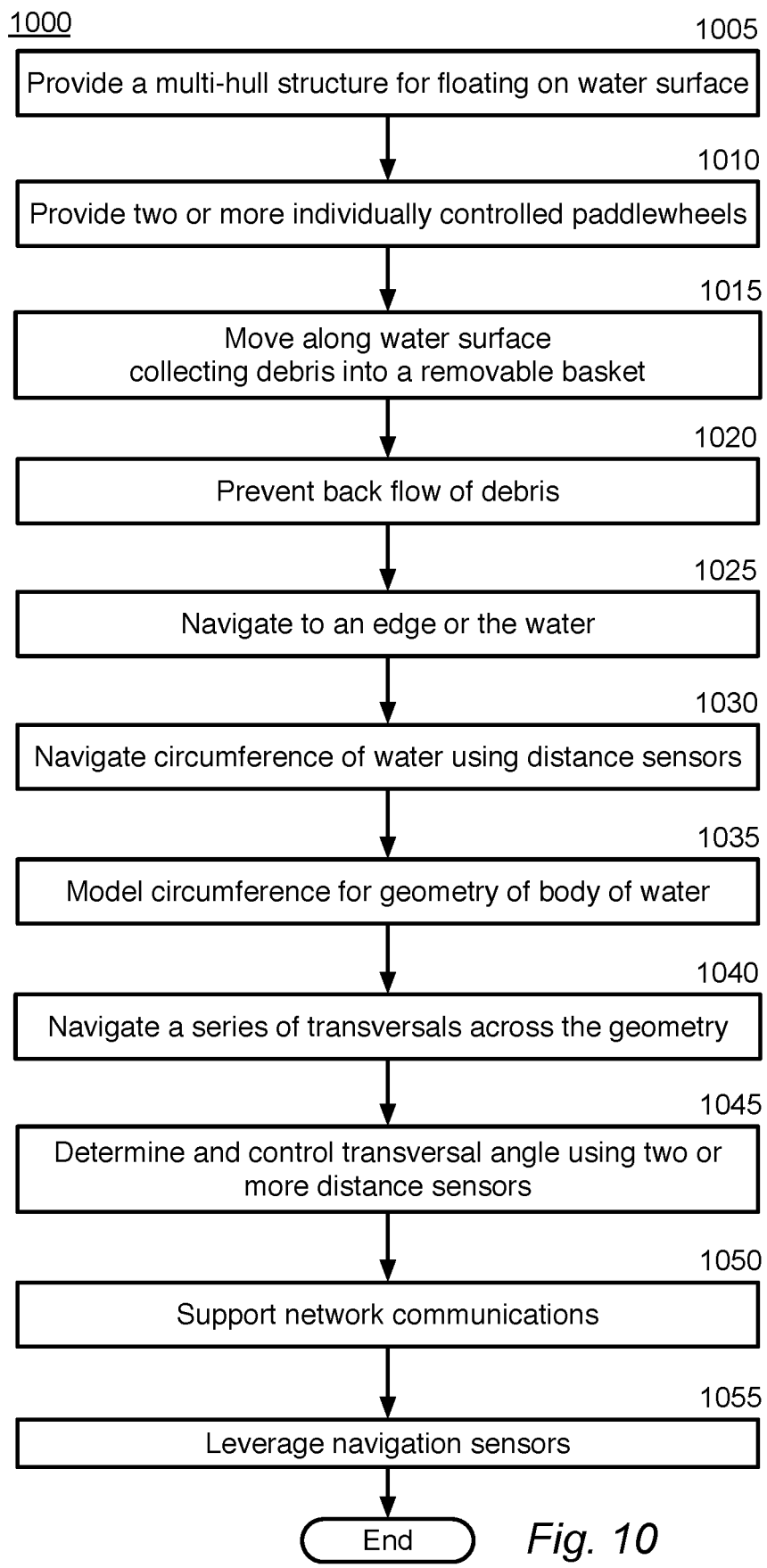
FIG. 10 is a block flow diagram depicting a method for skimming a pool using a pool-skimming robot in accordance with one or more embodiments presented herein.

FIG. 10 is a block flow diagram depicting a method 1000 for skimming a pool using a pool-skimming robot 100 in accordance with one or more embodiments presented herein. In block 1005, the pool-skimming robot 100 can comprise a multi-hull structure for floating on water surface of a body of water, such as a swimming pool.

In block 1010, the pool-skimming robot 100 can comprise two or more individually controlled paddlewheels 140. Independent control of the paddlewheels 140 can support precise directional navigation of the pool-skimming robot 100.

In block 1015, the pool-skimming robot 100 can propel itself along the water surface collecting debris. The processes of collecting debris may be referred to as skimming the water surface. The debris may be collected into a removable basket assembly 310.

In block 1020, the pool-skimming robot 100 can prevent or reduce the backflow of collected debris out of the pool-skimming robot 100 and into the pool. A backwash flap assembly 700 may comprise a backwash flap 710. The backwash flap 710 may be operable to rotate into open and closed positions to substantially reduce the backflow of collected debris.

In block 1025, the pool skimming robot controller 200 can navigate the pool-skimming robot 100 to an edge or the water. The edge of the water maybe detected using once or more of the distance sensors 150.

In block 1030, the pool skimming robot controller 200 can navigate the pool-skimming robot 100 near the circumference of body of water. The pool-skimming robot 100 can be navigated close to the edge using one or more of the distance sensors 150. In particular, distance sensors 150 along the side, or other side sensors may be useful in navigating the circumference.

In block 1035, the pool skimming robot controller 200 can model circumference geometry for the body of water. Navigation sensors 265 may be helpful in establishing such geometric models.

In block 1040, the pool skimming robot controller 200 can navigate a series of transversals across the geometry of the body of water.

In block 1045, pool skimming robot controller 200 can determine and control transversal angles using two or more distance sensors 150. Triangulation and other geometrical processing from multiple distance sensors 150 can support determining an angle of approach between the path of the pool-skimming robot 100 and a perimeter wall of the pool.

In block 1050, the pool skimming robot controller 200 can support network communications according to the communication interface 270.

In block 1055, the pool skimming robot controller 200 can leverage navigation sensors 265.

Example Systems

FIG. 11 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology.

It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. An autonomous water skimming system for a pool having a perimeter wall, comprising:
    a body comprising two or more hulls;
    one or more processing units;
    two or more paddlewheels coupled to the body, each paddlewheel driven by an independent motor, wherein the motors are independently controllable by the one or more processing units to support steering;
    two or more distance sensors;
    one or more solar cells;
    a power supply operable to power the one or more processing units and the motors from energy supplied by the one or more solar cells; and
    one or more processing modules, wherein the one or more processing units are configured by the one or more processing modules to navigate a circumference associate with a surface edge of a body of water according to signals associated with the two or more distance sensors, develop a model for a surface geometry of the body of water in response to the navigated circumference, plan a series of traversals across the model for the surface geometry of the body of water, and execute the planned series of traversals across the body of water in order to collect debris into a removable basket,
    wherein the signals associated with the two or more distance sensors are processed to establish an approach angle with respect to the perimeter wall of the pool.

2. The autonomous water skimming system of claim 1, further comprising a backwash flap.

3. The autonomous water skimming system of claim 1, further comprising one or more rechargeable battery cells.

4. The autonomous water skimming system of claim 1, further comprising a user interface.

5. The autonomous water skimming system of claim 1, further comprising a wireless communications interface.

6. The autonomous water skimming system of claim 1, wherein developing the model for the surface geometry of the body of water comprises establishing a model of a circumference geometry of the body of water.

7. The autonomous water skimming system of claim 1, wherein the paddlewheels comprise a side hub geometry comprising a central void.

8. The autonomous water skimming system of claim 1, wherein the one or more processing units comprise a semiconductor microcontroller.

9. The autonomous water skimming system of claim 1, further comprising one or more navigation sensors comprising one or more of a compass, gyroscope, accelerometer, and GPS.

* * * * *